J. S. BLACK.
Bee Hive.
No. 28,249.
Patented May 15, 1860.
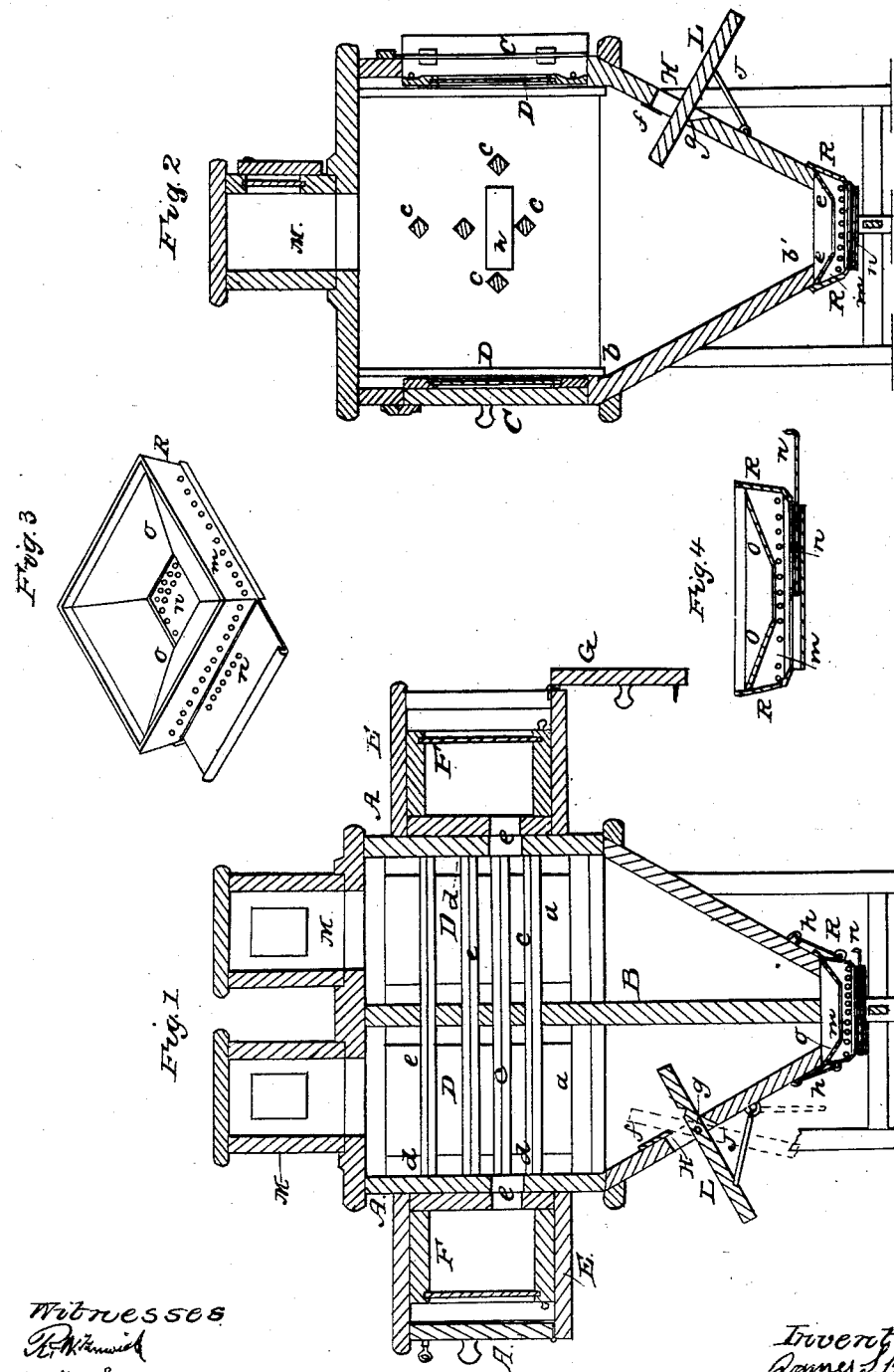

UNITED STATES PATENT OFFICE.

JAMES S. BLACK, OF BLOOMFIELD, KENTUCKY.

BEEHIVE.

Specification of Letters Patent No. 28,249, dated May 15, 1860.

*To all whom it may concern:*

Be it known that I, JAMES S. BLACK, of Bloomfield, in the county of Nelson and State of Kentucky, have invented a new and useful Improvement in Bee-Palaces; and I do hereby declare that the following is a full, clear, and exact description of the same, reference being had to the accompanying drawings, forming part of this specification, in which—

Figure 1, is a vertical longitudinal section of my improved bee palace. Fig. 2, is a vertical transverse section of the same. Fig. 3, is a perspective view of the ventilating moth trap detached, and on an enlarged scale. Fig. 4, is a sectional view of the same.

Similar letters of reference, in each of the several figures indicate corresponding parts.

To enable others, skilled in the art, to make and use my invention, I will proceed to describe its construction and operation.

A, in the drawing represents the central or main portion of the palace. This is divided into two chambers $a$, $a$, by a partition B; and its lower end is contracted gradually from $b$, to $b'$, so as to have the form of an inverted pyramid. Doors C, C, and windows D, D, are arranged on two sides of the part A, of the palace; and cross bars $c$, $c$, for supporting the comb, are extended from the partition B, to the ends, $d$, $d$, of the same.

E, E, are two side gums or chambers constructed on the ends of the part A, of the palace. Within these gums or chambers honey boxes F, F, having each a glass side, are placed. These boxes communicate with the chambers $a$, $a$, by passages $e$, $e$, as shown. Doors G, G, provided with lock and key, serve for closing the gums or chambers and protecting the honey boxes from rogues.

H, H, are the bee ingress and egress passages; they are cut through that part of the palace which has the form of an inverted pyramid, as shown. Projecting down from the top of each passage is a thin perforated strip $f$, for the purpose of aiding in ventilating the palace when the passages are closed. Through each passage a valve I, is passed. The valves are hung in an inclined position on pivots $g$, $g$, so that their outer ends outweigh their inner ends; they also project into the main chambers of the palace, and out from the exterior of the same, as represented.

J, J, are hinged rods for holding the valves in a position for closing the passages.

It will be seen that if the rods J, J, are thrown down to the position shown in red the valves owing to their outer ends being heavier than their inner ends will instantly assume the position shown in red and close the passages. It will also be seen that if the rods are adjusted to the position shown in black the passages will be opened. This mode of hanging the valves is very simple and enables the apiarian to close up all the passages at night in a very short time and with very little inconvenience. And besides this, the valves thus hung answer as alighting boards for the bees both on the outside and inside of the palace.

K, is a ventilating moth trap hung by rods $h$, $h$, under the open truncated end of the inverted pyramidical shaped portion of the palace; this trap consists of a perforated chamber $m$, a perforated removable sliding bottom $n$, and a funnel shaped conductor $o$, said conductor partly overhanging the chamber $m$, and leading into the same. This trap is designed for catching the moth or other enemies of the bee which are caused to fall from the upper part of the palace when attacked by the bees, or from any other cause. It will be seen that the moth or enemies of the bees in falling onto the inclined sides of the lower part of the palace and of the conductor will be precipitated into the chamber, and, if they seek to escape will most likely pass under the overhanging sides of the funnel and thus be entrapped. It will also be seen that the apiarian by drawing out the sliding bottom can readily get at or destroy the entrapped moth or enemies of the bees.

M, M, are the top honey boxes, in which the bees first begin to work. From these boxes the bees pass down into the chambers $a$, $a$, and after filling the same pass into the side gums or chambers F, F, and thus continue their work.

What I claim as my invention, and desire to secure by Letters Patent, is—

The combination and arrangement of the bee palace, constructed as described with the moth trap, constructed as described for the purpose set forth.

JAMES S. BLACK.

Witnesses:
GOODWIN Y. AT LEE,
R. W. FENWICK.